2,535,162

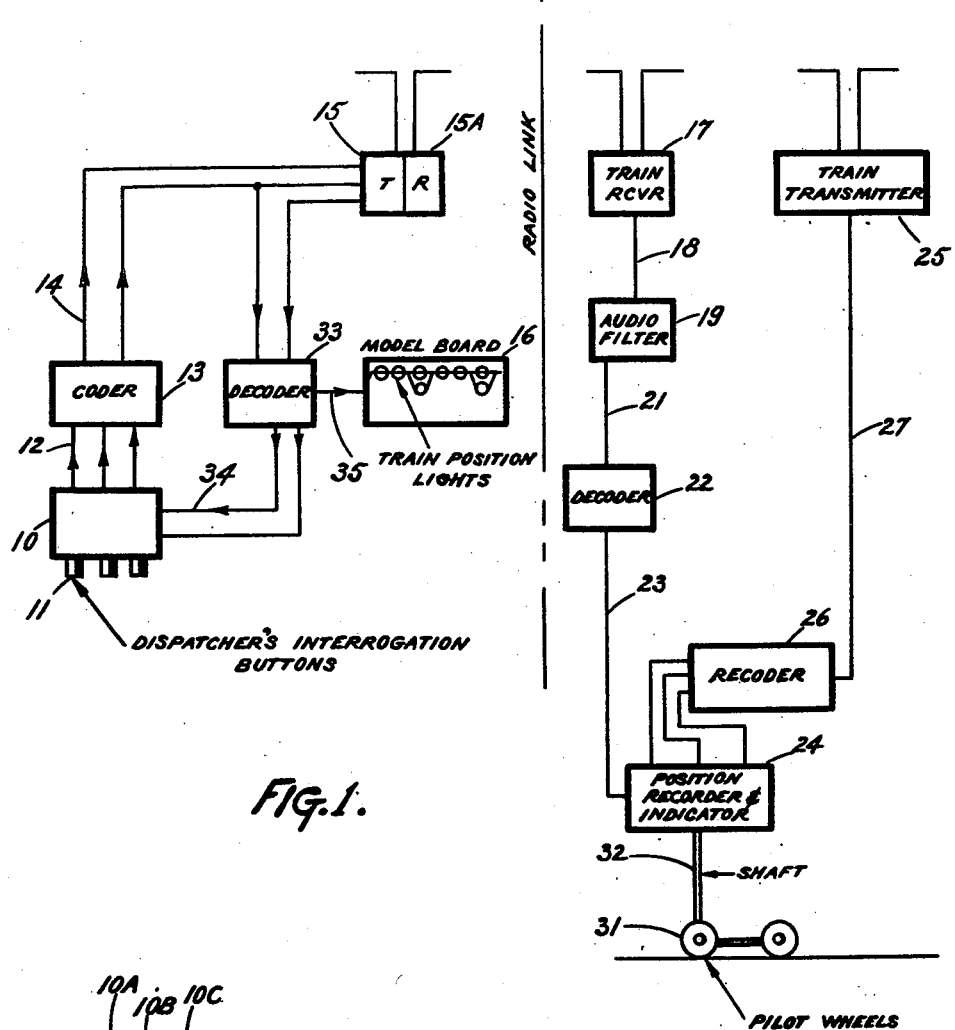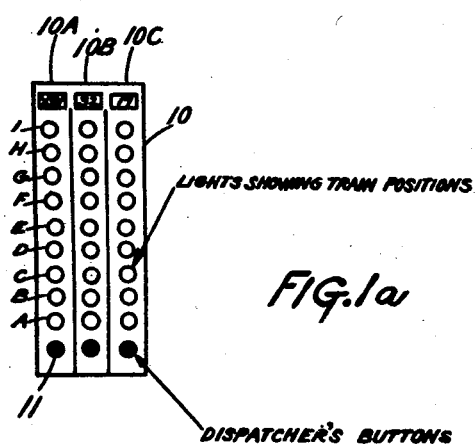

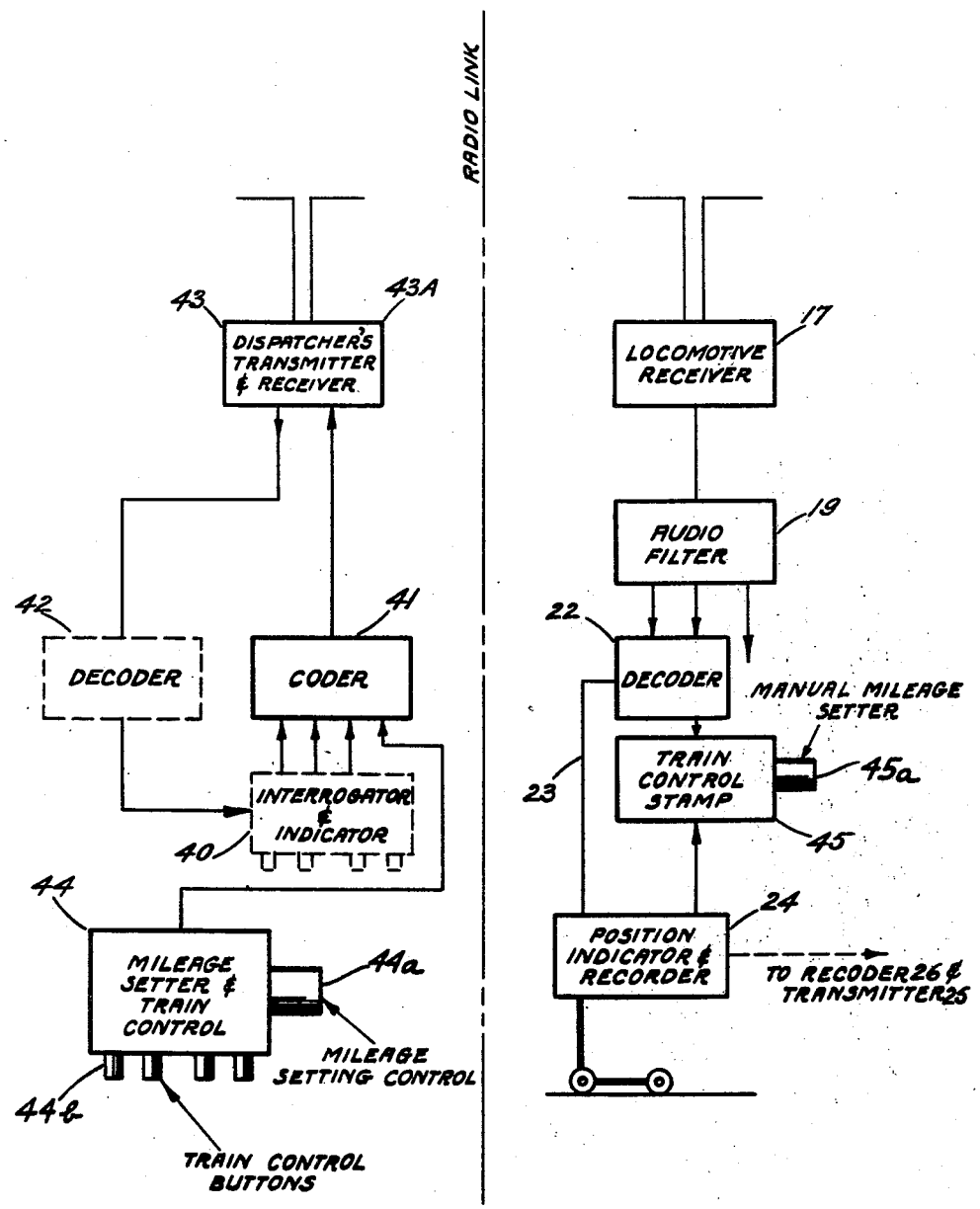

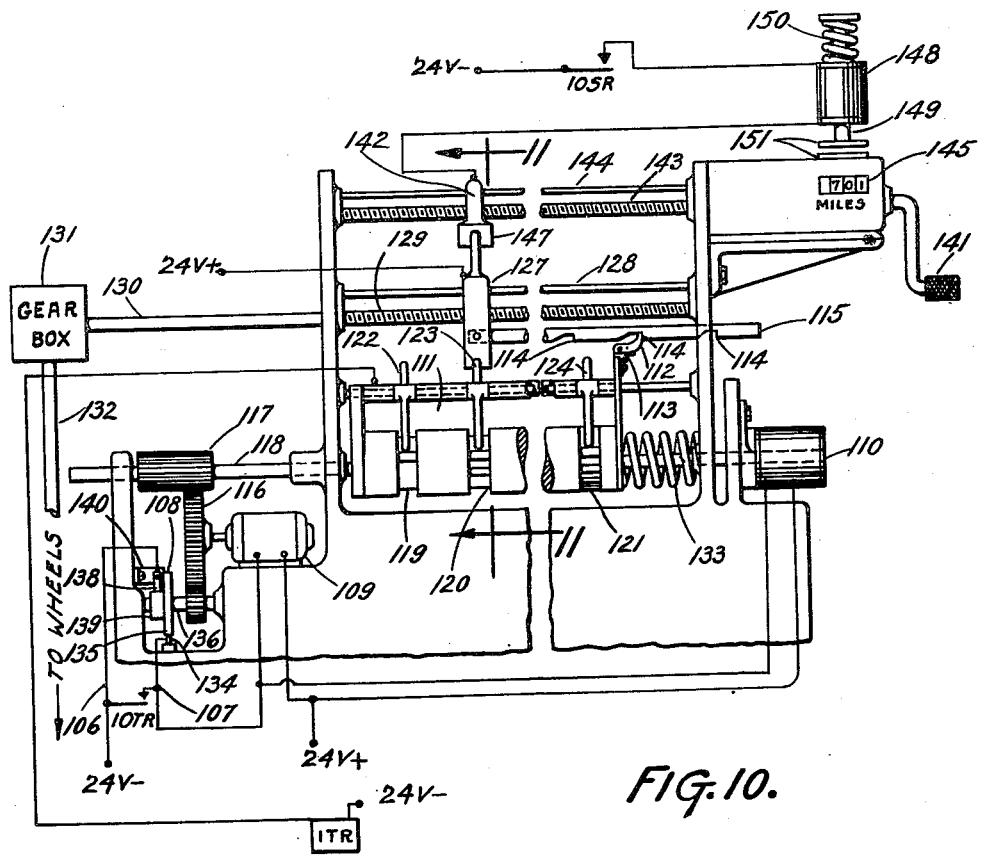
FIG. 10.
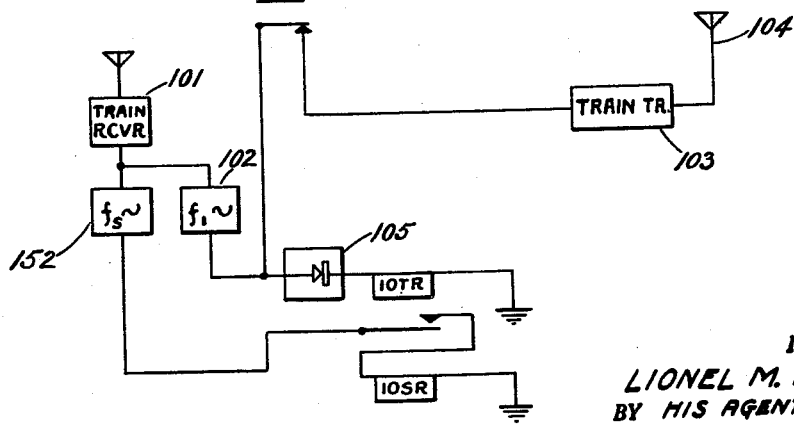
INVENTOR.
LIONEL M. RODGERS
BY HIS AGENT
Carl H. Synnestvedt Patented Dec. 26, 1950

UNITED STATES PATENT OFFICE 2,535,162

POSITION INDICATION AND CONTROL SYSTEM FOR MOVING OBJECTS OR VEHICLES

Lionel M. Rodgers, Springfield Township, Montgomery County, Pa., assignor, by mesne assignments, to Philco Corporation, Philadelphia, Pa., a corporation of Pennsylvania Application August 4, 1945, Serial No. 608,952

4 Claims. (Cl. 177—353)

This invention has to do with a novel method of and apparatus for indicating, at a point remote therefrom, the position of moving objects or vehicles. More particularly, the invention relates to such a method and apparatus involving the transmission of information from the object or vehicle regarding its position and direction, in response to interrogation from the remote point.

Although it is to be understood that the present invention is of broad utility and applicability, the concepts thereof are particularly applicable to the art of train control, and such an application forms the subject matter of the embodiment illustrated and hereinafter described. The illustrated system has reference to the determination and control of railway train movements by means of transmission and reception of intelligence between a dispatcher's station and the several trains in his territory.

Heretofore, systems for effecting centralized indication and control of moving vehicles have either been extremely complicated and expensive, or have been of such a nature as to lack the high degree of reliability which is a prerequisite to safety.

Although previous efforts to accomplish centralized indication and control have presented various problems and complications, depending upon the mode of transportation under consideration, the problems involved in centralized train control may be considered exemplary of the substantial difficulties involved. Previously, systems of train control have been provided wherein, by means of track circuits, line wires from a central point to positions along the track, and numerous wayside and central station relays, switches, and other equipment, it has been possible to determine the location of a number of trains and to govern their movements, at least to some extent. It will be readily appreciated that the cost of the equipment required in such a system is tremendous, and this fact has militated against the wide utilization of completely centralized traffic control. Moreover, such previous systems require a great deal of service and attention, thereby imposing a high operating burden on the railroads adopting the equipment.

As will be readily apparent, the provision of means serving to eliminate most of the trackside apparatus and wiring—while at the same time preserving the benefits of effective train control—would be a very substantial advance in the art. To attain this result, radio transmission appears as a useful medium. Heretofore, the radio systems proposed have been intended either for voice communication alone, or merely to replace a wire link and have, accordingly, lacked the desirable results achieved by the integrated system of this invention.

It is, therefore, the primary object of the present invention to overcome the difficulties and objections encountered in previous vehicle centralized-control systems, by the provision of novel apparatus involving no structural interlinkage of the moving vehicle with the central control point, yet being capable of transmitting the necessary intelligence with reliability, and in an automatic manner. In accordance with a primary feature of the invention, the foregoing broad objective is realized by utilization of means carried by the moving object or vehicle and capable of generating a signal characteristic of the distance of said object from a known reference point, at any particular instant, in novel combination with means at the remote control point for receiving said signal and automatically utilizing its distance characteristic to provide indication and control of the position of the vehicle.

It is a further object of the invention to provide such an indication and control system further including interrogation of the vehicle from the control point in such manner that the interrogation signal initiates operation of a transmitter, which transmitter then emits a carrier so modulated as to be indicative of the information required at the control point.

Accordingly, in one aspect of the invention, there is also provided a system by means of which a number of distinctive signals or "codes" are transmitted from a central station or dispatcher's location, said signals being of sufficient intensity to cover the region under control, and the system being such that the signals will be received by different vehicles, selectively, in accordance with the nature of the several signals.

To the foregoing general ends, and in the embodiment illustrated, radio transmitting and receiving equipment operating on suitable preassigned frequencies, are provided on each train, each receiver being such that it is responsive to one only of the distinctive signals or codes transmitted from the central station. For the purposes of initial brief description, it should be understood that the receiver on the interrogated vehicle, when actuated by its distinctive code signal, will initiate operation of the transmitter, thus automatically returning a suitable response.

The response signal is so modulated as to be unique to the particular train transmitting it and, in addition to carrying a distance indication, it serves to verify at the dispatcher's office the fact that the equipment is operating properly.

The distance characteristic of the signal transmitted by the vehicle may be readily included by modulating the signal in accordance with the determinations of an odometer, or other instrument provided to progressively determine and record the distance of the train, or other vehicle, from a fixed reference point, all as fully set forth hereinafter.

As thus far described, and having reference to the embodiment illustrated, it will be seen that provision is made to determine the advance of a number of trains along a right of way, and their location at any particular instant. In addition to providing such information, it is desirable that the apparatus be of such a nature that the dispatcher may exercise some control over the trains, or other vehicles with which the present invention is employed. Conditions may arise while a train is moving on regular schedule, which necessitate interruption of such a schedule, and it may then be necessary to cause the engineer to reduce speed, take a siding or otherwise depart from the regular running procedure.

Accordingly, the invention further contemplates the provision of a system of the type set forth which, additionally, is of such a nature that the usual distinctive interrogating signal may include some further code, when such is desirable, which will advise the engineer when he may proceed, and in the absence of this signal, inform him as to the action he should take. The aforementioned proceed signal, retransmitted, may serve to inform the dispatcher that the information has been received.

The invention also has as an object the provision of a system of the foregoing general nature, in which the interrogation signal may be adapted to provide the operator of the vehicle with a recordable clearance order.

The invention also extends to certain further concepts and novel details of construction and arrangement, hereinafter described and illustrated in the attached drawings, in which:

Figure 1 is a block diagram, showing the major components of a simple system of train interrogation and acknowledgement, according to my invention;

Figure 1a is a view on an enlarged scale of a train position board utilized in the system illustrated in Figure 1;

Figure 2 is a diagram similar to Figure 1 but including means to govern the movements of the trains;

Figure 10 is a party elevational and partly diagrammatic illustration of apparatus on the train;

Figure 3:
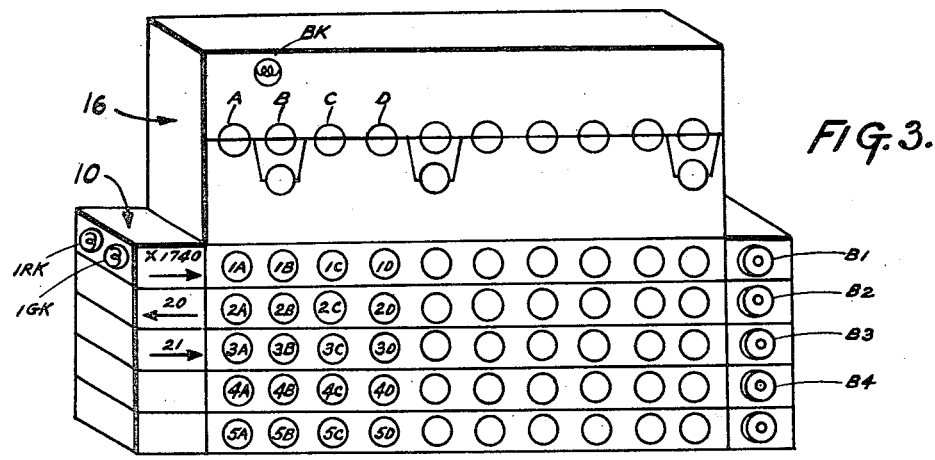
Figure 3 is a view in perspective of one form of a control board as contemplated in the present invention.

The block diagrams of Figures 1 and 2 will serve to illustrate the functions of the system as a whole. The detailed diagrams of Figures 3, 10, 11 and 12 represent components used in the system, while the wiring diagrams, Figures 4 to 10 inclusive, represent the electrical circuit of an embodiment of Figure 2. Figure 13 is a chart of the relay operation indicating by heavy lines the periods during which the designated relays are closed. It may be determined from Figure 13 which relays are closed and which are open at any given instant during the cycle.

*Broad summary of operation, described with reference to Figures 1, 1a and 2*

The devices of Figures 1 and 1a, the components of which will be described in greater detail hereinafter, is effective to provide the dispatcher with a means for determining the position of each train on the tracks under his supervision. Using the apparatus shown in the left-hand side of the figure, the dispatcher pushes the button 11 corresponding to the train with which he is concerned, and the coder 13 cooperates with the transmitter 15 to transmit a signal which may be received by a train anywhere in the area. The train receiver 17 receives the signal and the decoder 22 responds to the signal, but only if the signal is directed to that particular train. If the decoder 22 responds, the signal is passed on to the position recorder and indicator 24 which includes a device for recording the distance which the train has travelled from a reference point. Information characterized by this distance information is applied to the signal which is then passed through recoder 26. The signal is applied to train transmitter 25 and received by receiver 15a at the dispatcher's office and applied to decoder 33. The operation of decoder 33 causes a lamp to light on model board 16, and the appropriate light to show the train position on the panel 10 (see Figure 1a).

With further reference to Figures 1 and 1a, the apparatus shown on the left-hand side will be understood to be located at a fixed location, as in the dispatcher's office, while the equipment on the right-hand side is the train-carried apparatus, and is therefore movable along the track. Communication between the two sets of devices is preferably effected by means of radio signals, although other suitable means may be employed.

In the particular embodiment of the invention shown, the dispatcher's equipment comprises a vertically disposed panel 10 having on its face a plurality of columns of lights 10A, 10B, 10C, etc., corresponding in number to the number of trains to be controlled, the several lights in each column being positioned in rows A, B, . . . I. Over each column is a designating marker, for example "X91" in column 10A, which identifies a particular train operating in the controlled territory. Below each column is a push-button 11, which, when operated by the dispatcher, institutes the generation of a unique signal, or code, intended for cognizable reception only by the train to which the column applies.

It will be understood that these buttons, although just described as being manually operated, may also be automatically and successively operated, as by means of a motor driven travelling lever sweeping across them, so that train interrogations may be sent out at regular short intervals.

By means of conductors 12, a circuit is completed from each train interrogation button to a coding unit 13, which includes instrumentalities for generating a distinctive signal for each train. Thus, the button for row 10A may institute the generation of a signal of predetermined frequency, e. g. 4000 cycles per second, or a dot and dash signal or some other form of distinctive signal; that for row 10B a different signal e. g. 5000 cycles, or a double dash, etc., and so on, as desired. These individual signals in turn are transmitted over wires 14 by the selective actuation of a number of relays to the radio transmitter 15, which is thereupon caused to transmit the code for the train so called. Such transmission may be either by the choice of a specific frequency or wave length for each train, in which case there must be available as many bands as trains, or by transmitting the code signals over a common frequency. It will be apparent that any type of modulation of the transmitter may be used, and that frequency modulation may be desirable.

The energy radiated from the transmitter 15 is received by a receiver 17, located on the train, and which is tuned to the transmitted frequency. This signal, amplified and demodulated by receiver 17 is transmitted through conductors 18 to an audio filter 19, and thence through the line 21 to a decoder 22. If a separate audio frequency is used for each train, the audio filter 19 will serve as part of the decoder.

The decoder 22 includes suitable relays and selective devices, so that it will condition an output circuit in response to some particular signal only, as for example the assumed 4000 cycle or the dot and dash code generated by pushing the button for column 10A. Insofar as this same code may be picked up by the receivers of the other trains, there will be no ultimate reception, since their filters and their decoders, or both, are responsive only to some other and specifically different signal combination.

Assuming that the received signal is released by the decoder 22, current then flows over the wire 23 to a position recorder and indicator 24, which, in the embodiment here under consideration, performs two functions. The first is to cause a transmitter 25 located on the train to send out a signal distinctive to the train, as determined by the recoder 26, while the second function is to supplement the unique train signal with another signal which locates the position of the train in the territory. In accomplishing the first of these purposes, it will be readily apparent that the recoder 26, in part at least, may be similar in nature to the coder 13 at the central office. That is to say, its elements, in response to a current impulse supplied over the wire 23, transmit current through the wire 27 to the train transmitter 25. In the case of a frequency distinctive code, the recoder may be an audio filter tuned to the frequency of the code.

For practical purposes, the signal or code emanating from the recoder 26 may be the same as that given by the transmitter 15 for the receiving train, so that the interrogating signal and the acknowledging signal are the same, and in the case of a distinctive frequency code this frequency may be interrupted to give the position intelligence. For a simple interrogating and acknowledging system, the position indicator 24 may therefore be omitted without departing from certain of the principles of this invention.

A more satisfactory system is obtained, however, as previously stated, by employing the position indicator 24 to modify the recoded signal transmitted from the train to indicate its position. For this purpose, one of the locomotive pilot wheels 31, or other suitable actuating-wheel engaging the track, drives a shaft 32 leading to the cab equipment to operate an odometer, so that there is a control unit in the position recorder 24, constantly responsive to the distance that the train has moved. It may be assumed that the train, when leaving one terminal, starts out at a zero mileage setting, and, as the track distances are known, the odometer may advance the control unit, in proportion to miles, so that the control unit operates in step-by-step fashion in accordance with the movement of the train over a predetermined number of miles or "blocks."

The movement of the distance recorder 24, in turn conditions one of a number of circuits in recoder 26 to supply a signal which is added to or impressed upon the distinctive train signal, whose release is effected through the impulse received over the wire 23, as previously described. It is advantageous to inter-relate the "position signal" and the "train signal," so that the train signal current, in flowing through the position recorder 24, automatically connects the position signal current for flow into the conductor 27. By this means, the various position signals are prevented from being transmitted, except as an adjunct to the train signal itself.

Inasmuch as the plan of operation as just described is to have the position indication signal current available at any time the dispatcher may call, it will be seen that a code of signals may be decided upon, in which each one denotes some particular location or block. Thus, for example, a single pulse may mean block 1, up to two miles from a terminal, two pulses may mean block 2, two to four miles from the same terminal, and so on. Manual adjustment devices for the position controller 24 may also be provided, both for resetting at the terminal, and also to correct for rerouting the train over a branch line.

The signal emanating from the train transmitter 25 will thus carry both the train signal for the particular train, and a signal for its particular location. This energy is radiated back to the dispatcher's office, where it is received by the receiver 15A, which may conveniently be associated with the fixed transmitter 15. The current entering the receiver 15A passes to a dispatcher's decoder 33, where it energizes relays and associated devices to condition acknowledging and locating circuits. In this respect, the decoder 33 is specifically different from the train decoder 22, for, while the latter releases only a certain particular signal, the decoder 33 releases all incoming signals, and classifies them according to the information which they carry.

For this purpose, it should be explained, by way of example, that upon receipt of the assumed code signal from train X91, originally sent out by pushing button 11 in column 10A, the relays in decoder 33 respond selectively to establish a circuit 34 leading to the panel 10, and, specifically, to the rows of lights in column 10A thereof. At the same time, the other signals sent out by train X91 condition other relays to supply current both to the circuit 34, and also to a circuit 35 leading to the train model-board 16. Thus, as the position signal is received, current flows through both circuits to illuminate the proper block light in column 10A, and also that light on the model-board 16 indicating the same block. The dispatcher may then see at a glance that, for example, train X91 is in block E, and train 17 in block C, and may thus know not only the condition of occupancy of the track, but also which train is in each occupied position.

The model-board 16, as illustrated, is for a single track line provided with occasional turn-outs or sidings to permit the passage of trains either overtaking or running in opposite directions.

The device of Figure 2 differs from that of Figure 1 in that it has provision for giving clearance to a particular train at a particular position on the track. Having notified the train that he proposes to give clearance, as for example by interrogating the train as to its position, he presses the train control button 44B. If the train crew has responded to the previous warning by setting a train control stamp 45 manually, by means of the manual mileage setter 45A, to the position corresponding to that indicated by the position indicator and recorder 24, the mechanism will operate to provide clearance. Otherwise, the train will not be given clearance and the dispatcher will determine later that it is not proceeding. A full description of the construction and operation of the train control stamp and the manual mileage setter is included hereinafter, with particular reference to the detailed showings of Figures 10 and 11.

In Figure 2 the train interrogation board 40, coder 41, decoder 42, and combined transmitter and receiver 43A, 43, are similar in principle and operation to the units 10, 13, 33, and 15, 15A heretofore described. Likewise, with respect to the train-carried equipment on the right hand side of the figure, the radio receiver 17, filter 19, decoder 22, and location indicator 24 are the same as before, and accordingly have been designated by the same reference numerals.

Included in both the central station and the train equipment, however, in the embodiment of Figure 2, are manually operable devices which may be set in terms of the mileage of the called train from its reference terminal, and which must be properly set to complete the call and acknowledgement. These instrumentalities thus act as monitors on both dispatcher and crew, so that each knows that the other has actually understood the train movement and presumably will act as the situation requires. The dispatcher's unit for this purpose is a mileage setter and train control device 44, while the train-carried unit is a train control stamp 45.

The mileage setter 44 operates in conjunction with the coder 41, so that, when the previously considered train X91 is called through its frequency, dot and dash, or other distinctive signal, other relays are set up in the mileage setter 44, to add to that signal the code for a particular track location. Thus, from the model board 16 (see Figure 1), the dispatcher may learn that train X91 is at location D, or eight miles from its starting point, and its next position should be at location E, or two miles further along the route. The mileage setter 44 is accordingly manually set by the dispatcher for the mileage or location corresponding to the location light E. In addition to the regular code for train X91, the transmitter 43 will then also send, by modulation or by supplemental signal, the code for that particular location.

Upon its receipt by train X91, the code signal will condition the decoder 22 to supply current over the line 23, as previously described, to the train position indicator 24, and thence to the recoder 26 and the train transmitter 25. The actual release of current over the acknowledging circuits is governed, however, by the correct setting of the manually controlled train control stamp 45. This is set by a trainman, for example in passing from block D to block E, to a corresponding mileage. The act of setting the mileage selects a circuit which will be energized only by that code corresponding to block E and, unless so energized, will prevent the flow of current over the acknowledging circuit. Unless, therefore, the train crew anticipates the receipt of its next call, no acknowledgement can take place, and the dispatcher accordingly is advised of some lack of attention, or error on the part of the crew.

By means of suitable magnetic release devices, the flow of current through the train control stamp 45, coincident with the excitation of the acknowledging circuits, causes the movement of a lever carrying a printing stamp, which comes down to impress itself against a train card that is inserted in the device 45. This train card, upon being stamped as just described, serves as a clearance order enabling the train to proceed to its next station, and moreover provides a record of the movement of the train over its entire run.

*General description of construction and operation, with reference to Figures 3–10, inclusive*

Figure 3 shows the external appearance of a typical combined model-board 16 and train position-indicator panel 10 to which have been applied reference characters to aid in the understanding of Figures 4 to 10 which figures illustrate the electrical mechanism associated therewith.

The device shown in Figure 3 consists of the usual model board showing the track layout with lights to show occupancy and a series of rows of horizontally disposed lights immediately below each occupancy-light and representing one track section for one train. At the extreme left-hand end of each row is shown a removable train designation sign of translucent material, showing the number of the train and the direction in which it is traveling. For indicating purposes a light of one color to indicate that the machine is in operation and a light of a second color to indicate that there has been a machine failure may be employed behind this sign.

At the right of each horizontal row of lights is an interrogating button. These buttons, marked B1, B2, B3 and B4 in Figure 3, initiate the interrogation cycle. For example, if the dispatcher desires to determine where train "1740 East" is located, he merely presses button B1, at the upper left-hand corner of Figure 4, and the system sets up the latest information on the board.

Figure 4:
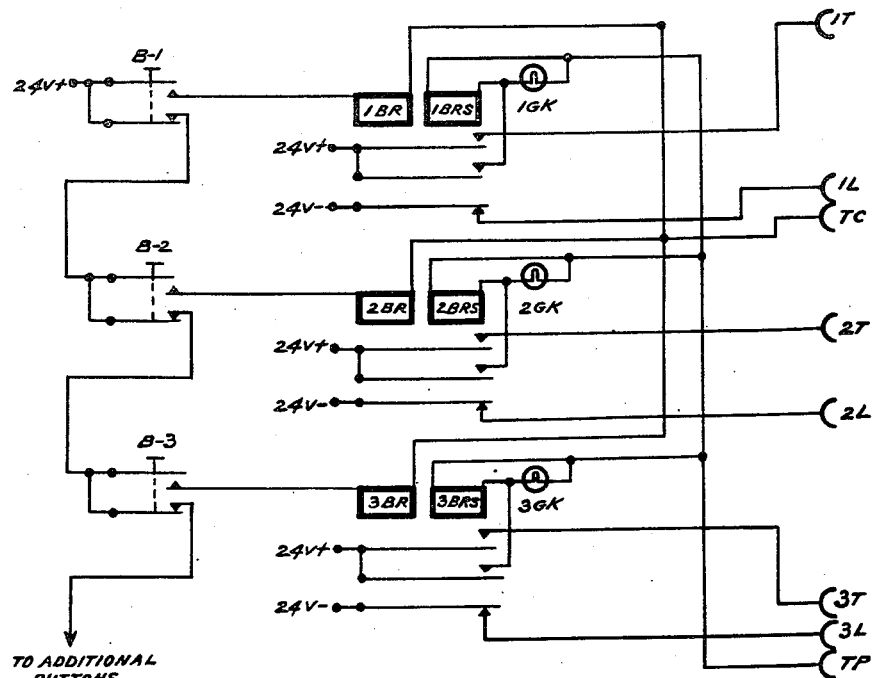
Figure 4 is a detailed wiring diagram of the pushbottons and associated relays employed to initiate an interrogation cycle.
Figure 5:
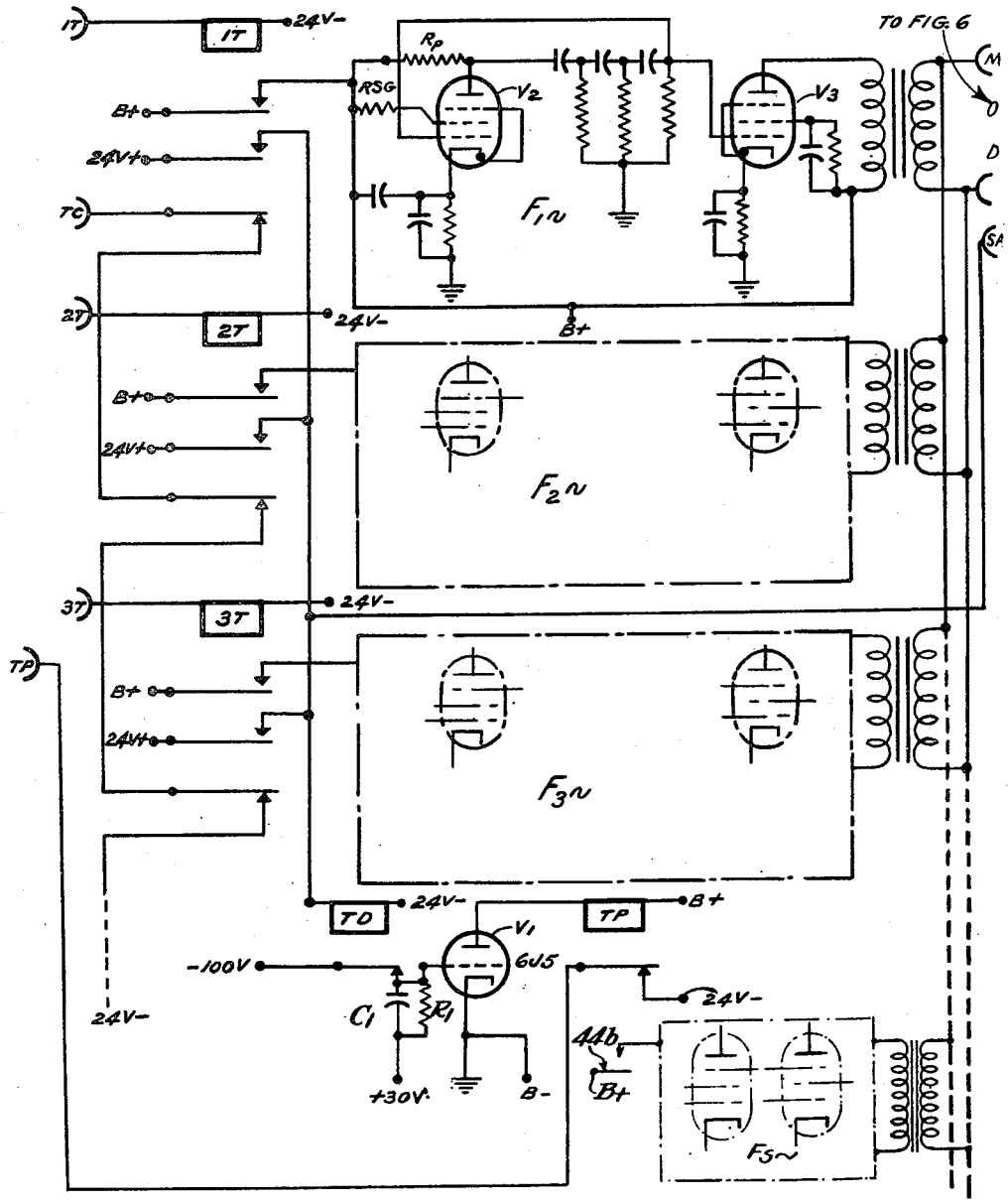
Figure 5 is a schematic diagram of oscillators used to generate distinctive signals, and control circuits therefor.
Figure 6:
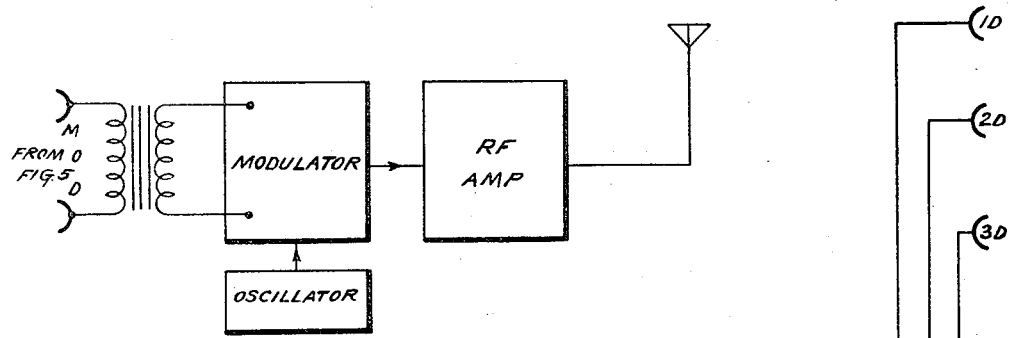
Figure 6 is a block diagram of the central station transmitter.

The electrical circuits which are actuated upon the operation of one of the buttons B of Figure 3 are shown in Figures 4 to 10. Figures 4 to 9 show the apparatus at the dispatcher's office while Figure 10 shows the apparatus on the train. Figures 4 to 6 illustrate the transmitter which is actuated by the dispatcher, and the circuits may be traced from one figure to the next by following those junctions which carry the same designations from one figure to the other. It will be noted, for example, that junction SA on Figure 5 of the transmitter is connected to junction SA on Figure 8 of the receiver, and that junctions L on Figure 4 are connected to junctions L on Figure 9.

Switches B1, B2 and B3 of Figure 4 are the switches operated by the corresponding buttons of Figure 3. The operation of any one of these switches B serves to disconnect the corresponding following switches and to energize a push button repeating relay BR which in turn energizes a corresponding stick coil BRS. This operation lights the proper green indicator lamp GK and energizes an oscillator control relay T (see Figure 5) as well as deenergizing one of the circuits including the appropriate one of the junctions L. Deenergization of this circuit L conditions the receiving apparatus shown in Figure 9 to indicate the presence or absence of a response from the train, as represented by the condition of the appropriate panel board lamp. The relay T energizes a code generator F which causes the modulator to modulate the transmitter oscillator so that an appropriate signal is transmitted for reception by the train. The relay T also energizes a time delay control relay TD which initiates a timing period at the end of which a timer repeater relay TP de-energizes the stick coil BRS (Figure 4) which was holding the relay BR closed. Thus the operation of the relay T serves to de-energize the coil of relay BR.

It will thus be seen that during the period between the pressing of the button B and the operation of the timing relay TP the green indicator light GK is maintained energized and the transmitter is modulated by a characteristic signal F. The transmitted signal is received by the apparatus shown in Figure 10 and re-transmitted after having been coded thereby. The coding there applied designates the mileage of the train away from the reference point and will be described in detail with particular reference to Figure 10.

Figure 7:
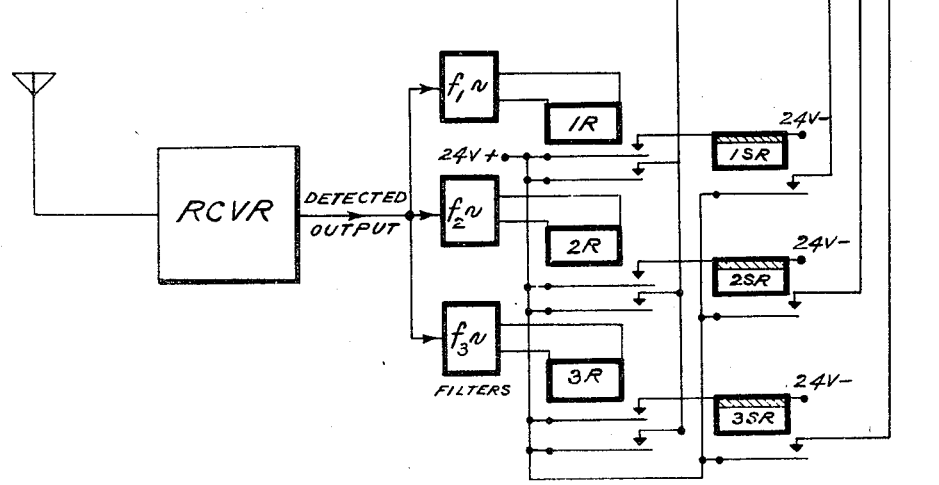
Figure 7 shows a block diagram of the central station receiver, and showing the filters and relays in the receiver output.
Figure 8:
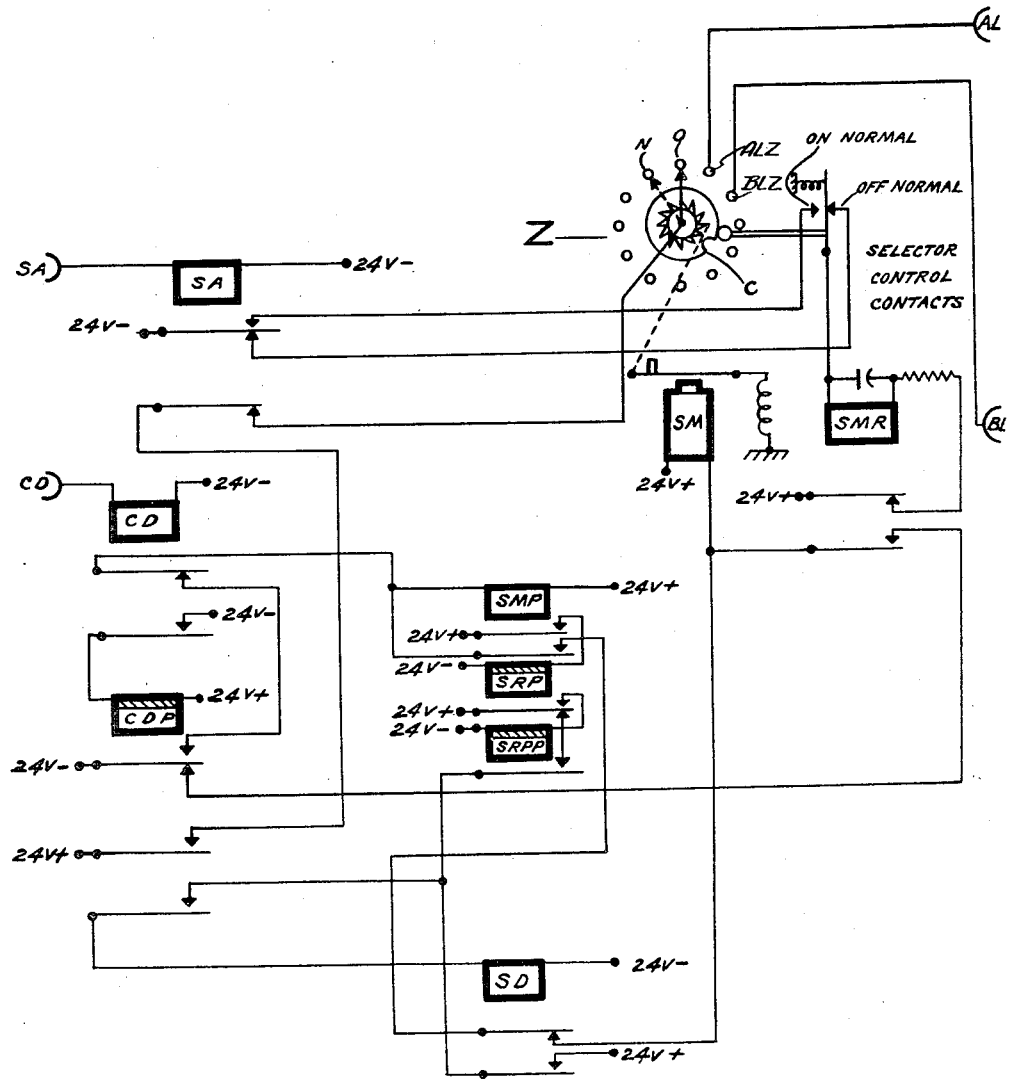
Figure 8 is a wiring diagram showing the local circuits which control the selector portion of the decoder.
Figure 9:
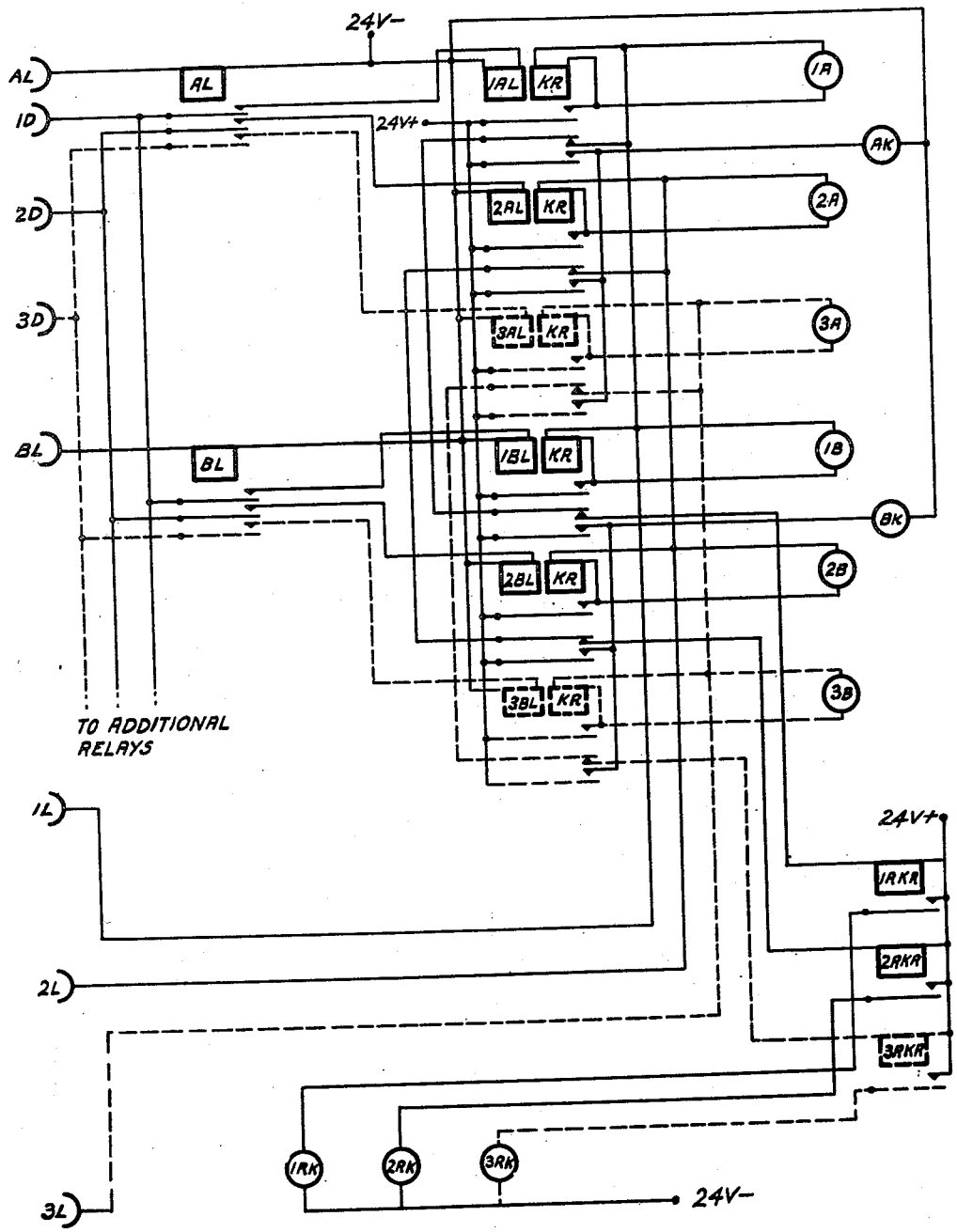
Figure 9 is a schematic diagram of the decoder and lock circuits and showing connections to the model board and train indicator lights.

The circuit of the receiver and decoder in the dispatcher's office is shown in Figures 7, 8 and 9, the connections from one figure to another having similarly designated junction points. It will be noted that junction SA on Figure 8 and junctions L on Figure 9 are connected to similarly lettered junctions shown in Figure 5 and Figure 4, respectively.

The returned signal, coded by the train, is received in the receiving apparatus of Figure 7 and selected by one of the filter-decoders f so that it is applied to the signal channel corresponding to that train. The signal passing through the filter f energizes a receiver relay R. The operation of relay R closes a slow release receiver repeater relay SR and energizes a line D and the common line CD. Referring to Figure 8 selector activator relay SA had previously been energized by the operation of relay T (Figure 5). Relay SA conditions stepping relay Z to receive the coding applied to the signal by the train. A common decoder relay CD is energized by relay R, shown in Figure 7. The coding is applied through relay CD to stepping magnet SM, which steps the selector Z a number of steps corresponding to the number of pulses in the code signal returned by the train. The rotating arm of the selector Z will come to rest on one of the numbered contacts and will thus energize one of the connectors AL, BL, etc. These connectors connect to the correspondingly designated relays on Figure 9 and close the circuits D originaing at the SR relays of Figure 7 of the receiver. This operation energizes the locking indication relay LKR (Figure 9) appropriate to the particular train and to the particular location of the train.

Whether relay ALKR, BLKR or another of the LKR relays is energized depends on the location of the train as indicated by the code. Whether conductor 1D, 2D or another of the D conductors is energized depends upon which train interrogation button B had been pressed. For example, receipt of the information from train 1 that it is in the first section (section A) will energize relay 1ALKR. When that train passes to section B its signal will cause relay 1BLKR to operate. Train 2 being in section B can actuate relay 2BLKR.

The operation of a relay LKR is indicated by the appropriately numbered lamp indicators 1A, 2A, 1B, etc., as well as by lamp indicators AK, BK, etc. (Figures 3 and 9). The first set of indicators above referred to is illustrated on Figure 3 as a set of position designating lamps appropriate to each of the trains. The second set of indicators may be, for example, indicator lamps on the model board at the upper portion of Figure 3.

One further feature of the LKR relays is a third circuit which is opened upon the operation of any of these relays. This third circuit opens the circuit to the red indicator relays RKR (Figure 9). Relays RKR are connected through junctions L to the circuits of Figure 4 of the transmitter and serve as an indication that the train interrogated did not respond. If none of the LKR relays has been energized during the period when a train ought to have responded (as timed by relay TP) the appropriate relay RKR closes, lighting an indicator lamp RK, on the panel board, which appears as a red light behind the train indication panel at the left side of Figure 3. The operation of the relay RKR is prevented during the time when the train should be transmitting its response, by the operation of the timer VI of Figure 5, which has not yet opened the contacts of relay TP. Because the relay TP is closed, the corresponding TP line of Figure 4 is energized and the stick winding BRS of the relay BR is holding the lowermost contact of the relay open. As long as this contact is open the conductor L is unenergized and, as is evident from the circuit of Figure 9, the relays RKR can only obtain their energy over conductors L.

*Detailed description of construction and operation*

The functions of the various components of the foregoing general system will now be described in complete detail, reference being had to Figures 3 to 13 inclusive. The components operate as follows, when the dispatcher interrogates a particular train: No signal is transmitted until the dispatcher presses one of the interrogation buttons B, shown in Figures 3 and 4. When he presses a button, B1 for example, he closes a circuit which causes an appropriate relay of the BR series to lock up. If he presses two buttons simultaneously, the circuits are so interlocked that only the upper one will cause its relay to lock up. When the relay BR associated with any one button locks up it performs three functions: First, it closes the circuit which results in interrogation of the proper train, in addition to lighting the green light back of the train designation sign. Second, it makes all the other interrogating buttons inoperative. Third, it de-energizes all the relays which remained locked up at the end of the previous interrogation cycle on the particular train involved, thereby extinguishing the indicator lamps for this train.

The first function, starting the interrogation, is accompanied by closing the "T," or tone circuit to Figure 5. The second function, i. e. de-energizing the other buttons is accomplished by opening the TC circuit, shown in Figures 4 and 5, through the energization of the appropriate T series relay, see Figure 5. The third function, de-energizing the locked-up relays associated with the train interrogated, is accomplished by opening the appropriate "L" or locking circuit, see Figure 9.

Figure 13 may be utilized to follow the described sequence of the relay operations.

Considering first the closing of the "T" circuit by the BR relay, and referring to Figure 5, the appropriate T relay will close, the associated oscillator F will be energized, and the transmitter shown in Figure 6, will be properly modulated. Also, the time delay relay TD, Figure 5, will cause the electronic timer V1 to start a cycle, which cycle will end with the closing of the "TP" relay. The connection SA to Figure 8 will be energized, causing the selector Z shown in Figure 8 to step from its normal position N to its preliminary position O, and the other circuits of Figure 8 to prepare themselves for the pulses which will be received.

The apparatus of Figure 10, on the trains causes the same modulating signal generated by the oscillator F of Figure 5 to be retransmitted, interrupted, however, by a series of pulses the number of which is determined by the location of the train.

The pulsed modulated signal put out by the train is received by the receiver in Figure 7, selected by the appropriate filter $f$ and caused to operate one of the "R" relays. The pulses which were put out by the train are repeated into the connection CD, but the "D" connection, being fed through a slow release relay SR is not affected by these pulses.

The CD connection in Figure 8 is connected to the common decoder relay CD. This relay, in conjunction with its slow release repeater relay CDP causes the selector Z to step in accordance with the number of incoming pulses. Since the number of pulses is determined by the position of the train, the location of the selector arm at the end of the series of pulses is determined by the train position.

The "D" connection, Figure 7, connects directly to the contacts of the "L" relays in Figure 9. The contacts ALZ and BLZ of the selector Z (Figure 8) connect through the corresponding connections to the coils of the "L" relays in Figure 9.

At the end of the cycle as determined by the electronic timer, V1, the connection TP to the BR relays of Figure 4 becomes de-energized and the BR relay, which was holding, releases, cutting off the tone and re-energizing the associated "L" connection at the lower left-hand side of Figure 9. The circuits of Figure 9, then select the proper lamps and light them, and the associated relays stay locked up until the same B button is pressed again.

If for any reason no signal is received back, the proper red indicator lamp RK will light, indicating a failure. This red lamp replaces the green lamp GK which lights during the interrogation period.

Additional relays SMP, SRP, SRPP, and SD, Figure 8, prevent false operation, and their purpose will be clear from the detailed description which follows.

When the dispatcher presses button B1, Figure 4, he connects the positive side of a 24 volt line through the contact of B1 to the operating coil of the button repeating relay 1BR. This coil is connected to a negative line through connection TC (see Figure 5), and through the back contacts of oscillator control relays 1T, 2T, 3T and as many similar relays as there are trains provided for in the control section. In the present example the model board is shown set up for five trains, maximum, and the schematic diagram is shown for a maximum of three trains. It is to be understood, of course, that the system may be extended to any reasonable number of trains by merely duplicating units.

At the moment of initiating an interrogation, as will be explained later, relays 1T, 2T, 3T, and all similar oscillator control relays would be in the unenergized condition, and relay 1BR would become energized. As soon as relay 1BR is energized its armature pulls up, and the holding coil 1BRS, the stick coil of relay 1BR, becomes energized, the circuit being from 24 volts plus through the front contact of the middle of the three moving contacts through TP connection to the system shown in Figure 5, and then through the back contact of de-energized time repeater relay TP to 24 volts minus.

The number one button relay stick coil 1BRS is thus seen to be self-energizing, and although the operating coil 1BR becomes de-energized when the dispatcher takes his finger off the button B1, the relay "holds-up" through the stick coil. In addition to closing its own stick circuit the relay 1BR closes a circuit from 24 volts plus to the connection 1T and opens the connection from 24 volts minus to 1L. The other end of the 1T connection is found in Figure 5, and as may be seen, it connects to the coil of the relay 1T. Energization of relay 1T applies positive potential from source B to the phase shift oscillator F1, setting this oscillator into operation. The negative side of source B is grounded. The second contact of relay 1T also closes and applies 24 volts plus to the operating the time delay relay TD of the time delay circuit and through the connection SA to the selector actuating relay SA shown in Figure 8. Energization of relay TD removes the 100 volt negative source of supply from the grid of the vacuum tube V1, which in the embodiment shown is a type 6J5 triode.

The grid of tube V1 is permanently connected through a parallel condenser C1 and resistor R1 of suitable time constant to a positive source of potential (30 volts), and when the charge, which was on the condenser at the time the TD contact opened, leaks away through the resistor the tube V1 will become conducting and will close the relay TP in its plate circuit. The time delay of circuit C₁R₁ is so arranged as to permit the completion of a full interrogation cycle. The result of energizing relay SA in Figure 8 will be described later.

The third contact of relay 1T is a back contact, and is in series with back contacts of 2T, 3T and all of the other similar relays. As has been previously mentioned this circuit supplies energy for the operating coil of relay 1BR and likewise supplies energy for the operating coils of all of the push-button relays BR. Thus it may be seen that as long as one of relays 1T, 2T, or 3T, is energized, pushing any of the other buttons will have no effect on the system. This provides an electrical interlock against the operation of more than one of the audio generators F at the same time. Relay TP has a single back contact, and this contact energizes the stick portion of the push-button relays 1BR, 2BR, 3BR, etc.

Across the stick winding of each of these relays is placed a green indicator light, 1GK, 2GK, and so forth (see Figure 3); these lights being placed behind the train number at the extreme left-hand side of each of the horizontal rows of lights, and indicate to the dispatcher that the cycle is ocurring. Assuming now that the dispatcher has pressed button B1, it is clear that the relay 1BR is pulled up and the coil 1BRS energized. Also it may be seen that relay 1T is energized and that the timer has begun to cycle. Moreover, the tone generator F1 is in operation and is putting out a signal of fixed, known frequency through the buffer amplifier V3 to the modulator of the transmitter shown in Figure 6. It is further apparent that the transmitter will transmit the desired audio note for a time determined by the time constant of the timer circuit RC.

The radio frequency carrier will be received by each train operating over the division. In the detector circuit of each of the mobile receivers the audio note which is transmitted, and which was set up by the oscillator F1, will appear. However, all excepting one of the mobile receivers has a filter in the detector circuit which will reject this frequency. The one remaining mobile receiver has a filter tuned to this frequency and will, therefore, react to it by means to be described later. Equipment on the train carrying this mobile receiver will code the frequency F1 with a code which includes information as to the distance from a fixed point, and will feed this coded signal F1 back into the modulator of its mobile transmitter.

Figure 7 shows the apparatus at the dispatcher's table for receiving this coded signal. The signal will be picked up, amplified and detected in receiver RCVR and the output fed into the series of filters f1, f2, f3, etc. Of these only f1 will pass the frequency received, and whatever pulsing is applied at the train will reappear in the receiver relay 1R of Figure 7.

The signal returned by the train, before the train commences to code the signal, causes relay 1R to be energized and its energization will cause 24 volts plus to appear through its front contact on connection CD and the coil of the slow release receiver repeater relay 1SR. As can be seen from the diagram, the series 1 decoder connection 1D through the front contact of relay 1SR, is peculiar to the relay 1R, whereas the common decoder connection CD is connected to all of the R relays in parallel. Referring to Figure 8, the connection CD is seen to go to the common decoder relay CD and then to 24 volts minus. The CD relay has one front and one back contact. The initial incoming signal causes the CD relay to close, opening its back contact and closing its front contact. Closing the front contact connects 24 volts minus to the coil of the slow-acting common decoder-repeater relay CDP which is connected to 24 volts plus. At the end of a brief time interval, determined by the delay characteristic of relay CDP the armature of CDP will pull up, thereby closing two front contacts and switching another contact. The function of these contacts will be considered shortly.

In order to understand fully the action of the selector controls, reference should be made to the operation of the selector activating relay SA, which became energized with energization of relay 1T, following the initial action of the dispatcher in pressing one of the buttons B. When relay SA was energized, it connected 24 volts minus through its front contact to the "on normal" contact actuated by the cam C on the rotary selector Z, shown at the upper right-hand corner of Figure 8. It should be understood that the "on normal" contact is closed when the selector Z is in the normal position, that is, when it is in its position of normal rest, and the "off normal" contact is closed in all other positions of the selector Z. At the beginning of the cycle the selector is in the rest position and the "on normal" contact is closed. Energy from the front contact of SA will therefore flow through the "on normal" contact through the selector-magnet relay SMR through the back contact relay SMR to 24 volts plus. Relay SMR has a suitable shunt capacity and series resistance to cause it to have both slow pickup and slow release characteristics. At a fixed time after the relay SA picks up, and energy is applied to the coil of relay SMR, the armature of SMR will pick up. Relay SMR also has a front contact, and when relay SMR picks up, this contact closes, closing the circuit from 24 volts plus through the selector operating magnet SM, through the front contact of SMR, through the back contact of CDP (which, as stated above, does not operate until a short time after a signal is returned from the train) to 24 volts minus. This circuit will cause the selector magnet SM to become energized and cause the selector to step from position N (normal) to position O. The action of stepping from position N to position O throws the contact operated by cam C from "on normal" to "off normal" and, since relay SA is energized, breaks the circuit to relay SMR. Relay SMR therefore becomes de-energized and shortly thereafter drops its armature, opening the circuit to the selector magnet SM. At this point the selector is in proper position to be stepped by pulses received from the train. This completes the initial set-up and the system is now ready to receive pulses from the train.

Tracing the path from 24 volts minus through the coil of a stepper disconnect relay SD through the front contact of relay CDP, it is found that this path leads to the front contact of slow release repeater relay SRPP. Since relay SRPP is not energized this circuit is open and relay SD remains de-energized.

Each pulse from the train causes relay 1R to release, breaking the two circuits to coil 1SR and connection CD. The front contact of 1SR (Figure 7) leads to the front contact of relays AL, BL, etc. (Figure 9), and none of these relays is closed. Connection CD leads to the relay CD which is normally energized when a signal is being received.

Assume that the train coder puts out two pulses, that is, it breaks the circuit twice in succession. The first break will let CD drop, closing its back contact and opening its front contact. Opening its front contact will remove the source of energy from the coil of CDP. Since CDP is a slow release relay, however, unless the pulse is of substantial length relay CDP will remain pulled-up. The closing of the back contact of relay CD connects 24 volts minus from the common connection on the top set of contacts on relay CDP through the front contact of relay CDP, through the back contact of relay CD, and then through two paths, the first to the stepping-magnet repeater-relay SMP to 24 volts plus, and the second through the front contact of relay SMP, through the back contact of de-energized relay SD, to the selector operating magnet SM and then to 24 volts plus. Energizing the coil of relay SMP causes the second front contact of SMP to close thereby energizing the coil of its slow release repeating relay SRP. SRP is, however, a quick pick-up relay and immediately closes, connecting the 24 volts plus of its common contact connection to its front contact and then to relay SRPP. Relay SRPP is another quick-pick-up slow-release relay and immediately becomes energized closing its front contact. Since the front contact of relay SRPP connects to the back contact of energized relay SRP there is no immediate effect caused by the closing of these three relays SMP, SRP, and SRPP.

Closing the circuit of the selector magnet SM causes the selector to take another step going from position O to position 1. At the end of the first pulse, relay CD picks up again. Closing of the front control of relay CD applies energy to the coil of relay CDP and maintains CDP in pulled up position. Opening of the back contact of relay CD breaks the circuit from 24 volts minus to the selector magnet SM and the relay SMP. Relay SMP immediately drops, opening its front contacts, but since relay SRP is a slow release relay, SRP stays pulled up for a predetermined length of time. The selector magnet SM releases and drops back into position to receive a second pulse.

When the second pulse arrives it causes relay CD to become de-energized, and thereby applies negative energy to relay SMP which becomes energized again. The front contacts of SMP close, again applying energy to the coil of SRP which, however, because of its slow release characteristically did not drop out during the off period. Simultaneously voltage is again applied to the selector magnet SM and the selector steps up to position 2. Since the train was assumed to be in such position that it would send back a code consisting of two pulses to indicate its position, this completes the series of pulses.

At the end of the second pulse, relay CD will become energized, causing the relay SMP and the selector magnet SM to become de-energized. Relay SMP, becoming de-energized, immediately causes its front contacts to open and removes energy from the coil of relay SRP. At the end of a predetermined time relay SRP drops out, thereby connecting 24 volts plus through its back contact, through the front contact of relay SRPP and then through the front contact of relay CDP to the coil of relay SD. When relay SD closes, it connects 24 volts plus over its own front contact through the front contact of relay CDP to its own coil thereby locking itself up until such time as CDP drops out. It also opens the circuit from the back contact of relay CD to selector magnet SM and thereby prevents any further pulses from affecting the selector magnet SM.

At the end of the timing cycle relay TP becomes energized, opening its back contact and disconnecting negative energy from the stick coil of IBRS and thereby de-energizing relay IBR. De-energizing relay IBR causes it to immediately open its front contact and disconnect 24 volts plus from the connection IT, thereby de-energizing the coil of relay IT. De-energizing relay IT permits this relay to release, disconnecting 24 volts plus from the coil of relay SA shown in Figure 8. Relay SA then releases and connects 24 volts minus through its back contact to the "off normal" connection of the cam operated selector contacts and thence through the common connection of the selector control contacts to the coil of the relay SMR, then through its own back contact to 24 volts plus. Relay SMR will immediately start to repeatedly close and open at a rate determined by the time constant of the relay itself, its shunt capacity and its series resistor. As this relay repeatedly closes and opens, it causes its front contact to close and open and thereby closes and opens that part of the circuit extending from 24 volts plus through the selector magnet SM, through the front contact of relay SMR and through the back contact of relay CDP to 24 volts minus. However, as heretofore noted, relay CDP is a slow release relay and for a definite interval of time it will remain pulled up.

Dropping of the relay IT also removed B+ from the oscillator F1 and therefore removes modulation from the transmitter. The train transmitter, which merely relays what it receives, also becomes unmodulated and no further signal is received by the receiver RCVR at the dispatcher's location. Relay IR of Figure 7 will immediately drop, removing energy from relays ISR and CD. The time constant of relay ISR is comparable to that of relay CDP, so that energy is maintained on the connection ID, after relay IR is released, and until approximately the same time that relay CDP drops out.

When energy is removed from CD, relay CD drops, thereby disconnecting the power from the coil of CDP and simultaneously connecting 24 volts minus through the front contact of CDP and through the back contact of CD to the coil of SMP. Since relay SD is energized this does not cause the selector magnet SM to step. Thus the purpose of the four relays SMP, SRP, SRPP, and SD, is to prevent the selector from taking a step at the end of the cycle or on any false pulse which might come through following the completion of the series of pulses which are put out by the train.

At the time relay SA was de-energized it also closed a separate back contact, thereby connecting 24 volts plus through the front contact of relay CDP, through the back contact of relay SA, and to the rotary arm of the selector Z. The contact 2, on which the selector is at rest at this point, is then energized, and connection BLZ is connected to 24 volts plus. Referring now to Figure 9, it may be seen that connection BLZ goes to the coil of relay BL and then to 24 volts minus. Thus when relay SA dropped it immediately energized relay BL. Also, when relay IR dropped it did not immediately cause relay ISR to release and therefore the positive energy was still applied through the front contact of ISR to the connection ID in Figure 9. This is connected in multiple to a front contact on each of the section locking relays AL, BL, etc. In the present case relay BL is the only one energized and energy flows through the front contact of relay BL from the connection ID to the coil of the IB locking indication-relay IBLKR. Relay IBLKR is a quick acting relay and immediately pulls up its armature closing its front contact, which leads from 24 volts plus through its own stick or locking coil to the lead IL, shown at the bottom of Figure 9. Conductor IL is the connection to the back contact of relay IBR (Figure 1) and as already has been seen this relay became de-energized at the end of the timing cycle and will remain de-energized until the push-button B1 is again pressed. Relay IBLKR therefore locks itself in energized position. Lamp IBK is connected across the stick coil of relay IBLKR and since this stick coil is energized, lamp IBK becomes energized showing the location of train "1714 East" to be in block B. There are two other contacts on relay IBLKR. The first of these is a back contact and is connected in series with the similar contacts on relay IALKR, and all other relays in the "1" series. One end of this series circuit is connected to the connection IL and the other end is connected through coil IRKR to 24 volts plus. The third contact on relay IBLKR is a front contact and connects 24 volts plus to the light BK which in turn returns to 24 volts minus. This contact is in parallel with a front contact of each of the relays of the BLKR series, and thus the light BK is lit regardless of which one of these relays is energized. The light BK is the light for section B on the main part of the model board and thus it may be seen that if any train is in section B, the light BK on the model board will be illuminated.

The first red indicator-relay, IRKR, has a single front contact connected between 24 volts plus and the "1" series red indicator lamp IRK which in turn is connected to 24 volts minus. If no relay in the ILKR series is energized, that is, if neither IALKR, IBLKR, or ILKR is energized at the end of a timing cycle, current will flow from 24 volts minus through connection IL, through the back contacts of all these relays in series, and through the coil of relay LRKR. This will energize the coil of IRKR, closing the front contact, and causing the light IRK to become illuminated.

The light IRK is located with the light IGK behind the train number on the left-hand side of the model board (see Figure 3). In the case of failure of an indication to come back at the end of a cycle the red indicator will light. The dispatcher therefore will be immediately informed of either an equipment failure, a transmission failure, or some other condition requiring his attention. In the event of a transmission failure it would be only necessary for him to press the button again, and the equipment would again cycle.

The mechanism carried by the train is shown in detail in Figures 10, 11, and 12, and its construction and operation is as follows: The incoming signal from the dispatcher is received by the train receiver 101. If the signal is directed to that particular train, it passes filter 102 and from there through the back contact of relay ITR, to the train transmitter 103 from which it is reradiated by antenna 104. Thus the receipt of the calling tone is acknowledged by its retransmission. The received tone is also rectified in rectifier 105 and actuates relay 10TR. Relay 10TR has two sets of front contacts, one of which connects relay 10SR to filter $f_s$, the other of which (see left-hand middle portion of Figure 10) connects together conductors 106 and 107 across switch 108, connecting 24 volts negative to the motor 109 and solenoid 110, both of which are connected to 24 volts positive.

Solenoid 110 urges a shiftable timing frame 111 to the right, until the finger 112 is driven by spring 113 into one of the notches 114, in a stop rod 115. Motor 109 drives gear 116, which rotates gear 117 fixed to shaft 118. Shaft 118 rotates timing cams 119, 120, and 121, which are supported in timing frame 111. Timing arms 122, 123, and 124 are held in contact with timing cams 119, 120, and 121, respectively, by springs similar to spring 125 (see Figure 11). A resilient contact 126, carried by the upper end portion of timing arm 123 (see Figure 11), is normally out of contact with traveller 127 but contacts the traveller 127 when timing arm 123 is driven outward by a rise on cam 120. In this connection, it should be borne in mind that the entire timing assembly (including the shiftable frame 111, the several timing arms, the traveller 127 and its stop rod 115, etc.) have been broken away and shortened, to facilitate illustration. It will be understood that the timing cams, three of which are illustrated at 119, 120, and 121, actually correspond in number to the number of blocks under the dispatcher's control, and that the remaining apparatus would be correspondingly elongated.

By tracing the circuit it may be seen that the rotation of cam 120 will cause contact 126 to contact traveller 127 (see Figure 11) closing the circuit from 24 volts positive through relay coil ITR to 24 volts negative. The contacts of relay ITR will thus be opened in correspondence with the rises on timing cam 120, each of the timing cams having a different number of rises. In this manner the mechanism will operate to break the retransmitted tone in a coded sequence appropriate to the particular timing cam which is at that time associated with traveller 127.

Traveller 127 is moved along guide rod 128 while the screw threads 129 on shaft 130 move the traveller 127 along said shaft 130. Shaft 130 is, in turn, driven by gear box 131 from shaft 132, which is suitably coupled to the wheels of the train. In this manner, the position of the traveller 127 is always in correspondence to the position of the train on the track, it being understood that increments of distance, from the dispatcher's location, correspond to increments to length, from left to right, along the threaded portion of shaft 130.

The solenoid 110 and the spring 133 serve to locate the timing frame 111 so that one or another of the arms 122, 123 or 124 is always opposite the traveller 127, when the relay 10TR is closed. This will be apparent from the fact that the notches 114 are spaced apart the same distance as the arms 122 and 123, so that, when the timing frame 111 is urged to the right by solenoid 110, it is stopped by one or another of the notches 114; in this manner one or another of the arms 122, 123 or 124, is always in the proper position for operation in conjunction with traveller 127. The particular arm selected will always be the one which the traveller 127 is passing, or has just passed, and in this manner the particular code impressed upon the retransmitted signal is a positive indication of the block which the train occupies.

Figure 12:
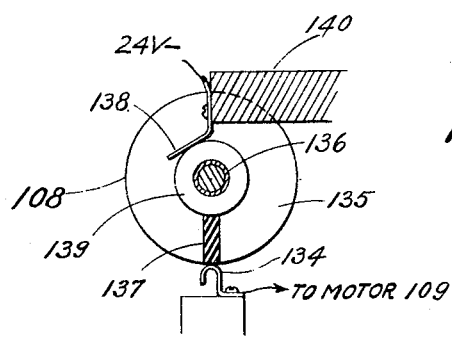
Figure 12 is a detail of a switch of Figure 10.
Figure 13:
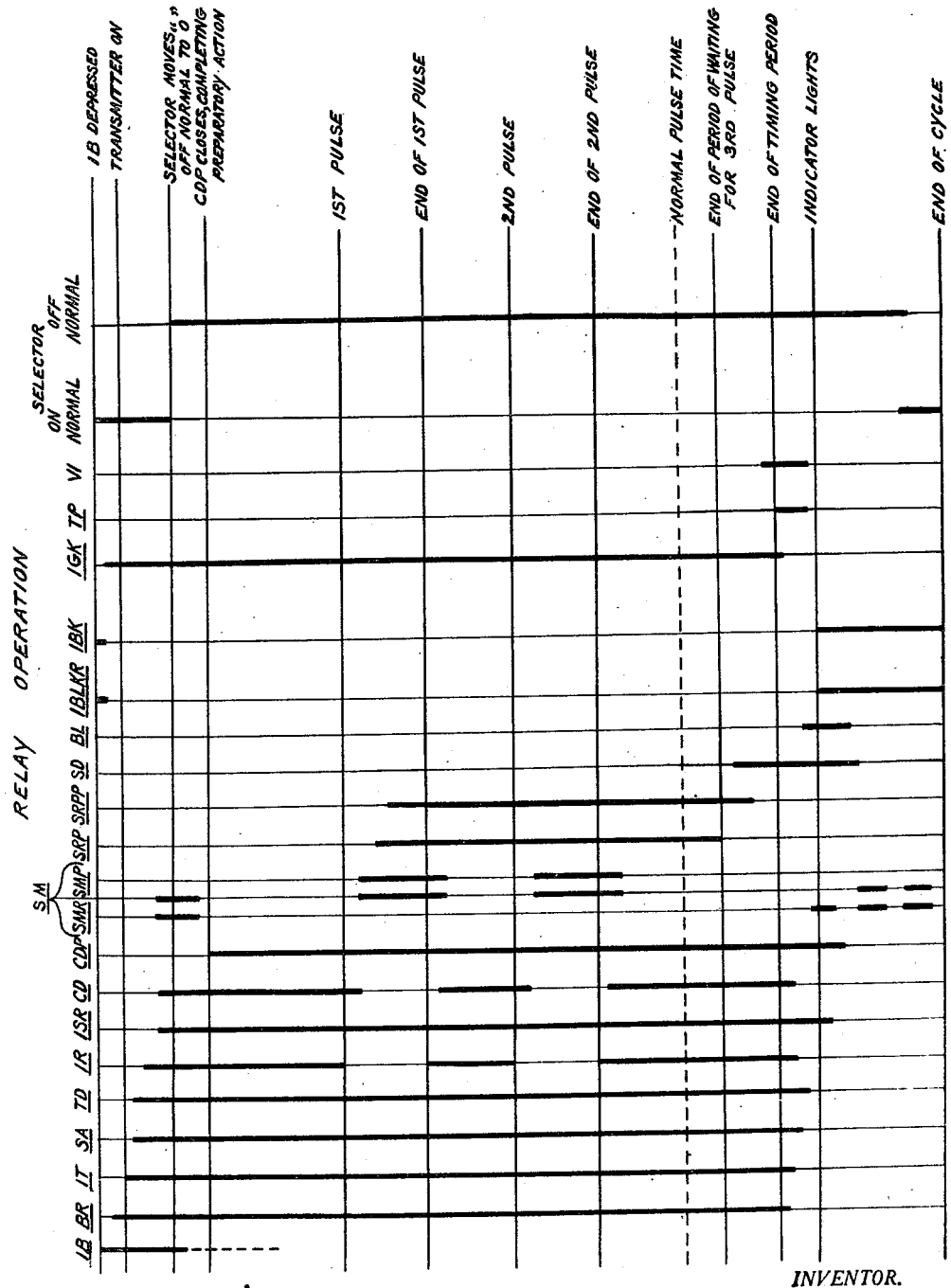
Figure 13 is a sequence diagram of the operation of the relays.

The details of switch 108 are shown in Figure 12. Contact 134 is connected to the motor 109 and is mounted on the main frame. Conducting disk 135 is mounted on shaft 136 which, in turn, is geared to gear 116. Conducting disk 135 is provided with an insulating segment 137, which opens the circuit between disk 135 and contact 134, when segment 137 is in the lowermost position. Contact 138 contacts the edge of conducting disk 139 which is directly connected to disk 135, while contact 138 is mounted by bracket 140 to the frame, and is connected to 24 volts negative.

The purpose of the switch 108 is to provide that the timing cams 119, 120 and 121 will always start from the same angular position. To this end, the disk 135 and said shaft 116 are brought to a stop at the same angular position, at the completion of each actuation, by causing the motor circuit to be broken when the segment 137 is at its lowermost point, as above mentioned, the gearing between the motor and said two shafts, of course, being such as to drive both shafts at the same angular rate. Furthermore, it will be evident that the system of Figure 10 will retransmit the tone received through filter 102 with the appropriate coding applied thereto as long as it receives the tone.

Figure 11:
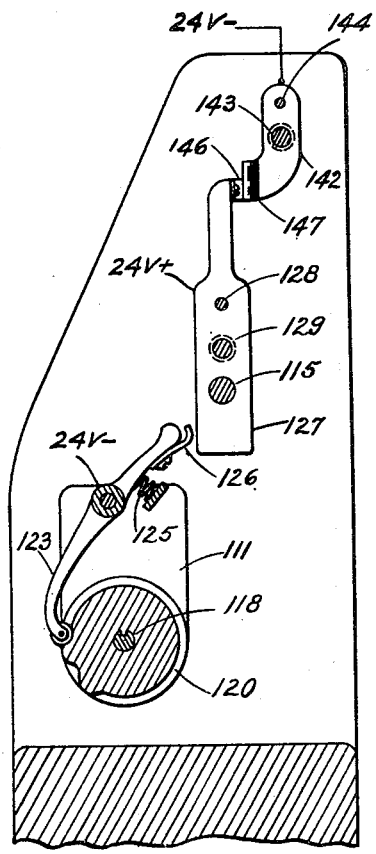
Figure 11 is a section on the line 11—11 of Figure 10.

Appropriate mechanism by which the dispatcher may give clearance to the train crew is also shown in Figures 10 and 11, and functions as follows. Upon being advised that the dispatcher is ready to give clearance, the train crew rotates the handle 141, thereby causing rider 142 to be driven by screw thread 143 along guide rod 144. This rotation of handle 141 is continued until the mileage, corresponding to the actual position of the train, appears in window 145. The actual mileage so set up should appear in this window when the rider 142 is in alignment with traveller 127, as shown in Figure 10. Traveller 127 is provided with a spring contact finger 146, and rider 142 is provided with a suitable curved surface 147 so that these parts may be brought into registration without interference. If desired, these parts may be concealed from the view of the train crew by an appropriate housing, which may also serve as a dust cover, such concealment making it necessary for the crew to observe the actual mileage and set it up in the window, rather than merely bring the rider 142 into contact with the traveller 127 without cross checking the actual location of the train.

When rider 142 and traveller 127 are brought into contact, a circuit is closed from 24 volts positive through solenoid winding 149 and the front contact of relay 10SR (see top of Figure 10) to 24 volts negative. Solenoid 148 when energized projects its plunger 149 downwardly against the force of spring 150, to bring stamping dies 151 together. The lower stamping die will preferably include an opening through which numbers, corresponding to the numbers visible through window 145, and other appropriate data, such as the time, will be impressed on the card inserted between said dies.

It will be evident that if the train crew has properly adjusted the handle 141 to indicate the distance of the train from the terminal, the stamp will be energized when the front contact of relay 10SR is closed. The dispatcher may close this contact by sending out the two tones which will pass filter 102 and filter 152. One of these tones, for example $F_1$ (Figure 5), is generated by the normal operation of the interrogation system, as above described. The other, $F_s$, is generated in response to manual operation of one of the train control or clearance buttons 44b, shown and described with reference to Figure 2.

As appears in Figure 5, a single signal may serve as this second signal with respect to any selected train, the signal being accepted only by that train which is being called simultaneously with its characteristic interrogating signal. In which connection, see the description with reference to Figure 10. This single signal ($F_s$) is provided by an additional generator of the type supplying the interrogation tone ($F_1$) and is also shown as connected to the "MOD" terminals of Figures 5 and 6. As aforesaid, the $F_s$ generator is manually operated by button 44b of Figure 2 rather than being automatically operated by relays, as are the other oscillators of Figure 5. The tone passing through filter 102 closes the circuit to relay 10TR. The tone passing through filter 152 energizes relay 10SR but, as stated above, such energization will only function to operate stamp 151 if the handle 141 has been correctly positioned. This mechanism thus provides that clearance may only be received by the train crew if they have set handle 141 to the position correctly corresponding to the position of the train. For further assurance of the attention of the train crew to this matter, and for protection against accidental giving of clearance, means may be provided whereby the screw 143 is returned by a spring or motor to its initial position, unless it is manually restrained. Alternatively, means may be provided whereby an audible signal from the dispatcher, indicating that he is ready to give clearance, may be used to return the screw 143 to the initial position. If acknowledgement to the dispatcher of the receipt of the clearance is desired, a further set of connections may be provided, connecting the circuit of stamp solenoid 148 to filter 152 and to the train transmitter 131, which will retransmit the tone passed by filter 152 at the time that the clearance stamp is closed.

Summary of relay operations

Figure 13 shows a diagram of relay operation and illustrates the coordination of the movement of the various relays. In this figure the vertical axis represents time, zero time being shown at the top of the page. The horizontal axis is marked with the designation of the various contacts and relays and the lines below are solid at such time as the relay is closed, and open where the relay is open. Further explanatory notes are shown in the column at the extreme right, and light horizontal lines have been drawn across the page, so that the position of the various relays can be determined at points where important changes are occuring in the system.

The cycle is begun by depressing a push-button B. A short time later, as determined by the time constant of the relay 1BR, the relay 1BR will close lighting 1GK, its closing will be immediately followed by the closing of the relay 1T which in turn is followed by the closing of relay SA and the relay TD. Closing of the relay 1T placed the transmitter in operation and caused a signal to go out on the air. This signal returning causes relay 1R to pick up and immediately thereafter relays 1SR and CD close.

Closing of relay SA caused relay SMR to become energized and a short time thereafter this relay closes, causing the stepping magnet SM to become energized.

When the magnet SM steps, it causes the selector to move and the "on normal" contact to open and the "off normal" contact to close. This is indicated in the right hand margin, at the point where it is stated that the selector moves off normal to "O." As soon as the stepping magnet SM moves to "off normal" the current is removed from SMR, and at a time period later, as determined by the time constant of this relay, the relay SMR drops, de-energizing the stepping magnet SM. Shortly thereafter the relay CDP closes, the time interval between the closing of CD and the closing of CDP being determined by the time delay constant of the relay CDP. The system is now in equilibrium until the receipt of the first pulse which opens the relay IR, thereby opening, in turn, relay CD and closing SM and SMP in coincidence.

Relays SRP and SRPP close sequentially after the closing of relay SMP. Energization of stepping magnet SM has caused the selector to take another step, and equilibrium is then again established until the end of the first pulse. At the end of the first pulse relay IR again becomes energized, the relay CD becomes energized, relay SMP and the selector magnet SM becomes de-energized, and the equipment then rests until the receipt of the second pulse.

Receipt of the second pulse acts in exactly the same way as the receipt of the first pulse, excepting that relays SRP and SRPP, which were de-energized at the beginning of the first pulse, are actuated at the beginning of the second pulse. This condition is due to the long delay drop-out characteristic of these two relays which result in a hold-in through the period between the end of the first pulse and the beginning of the second pulse. At the end of the second pulse the relay IR again becomes energized causing the relay CD to be energized, the relay SMP to drop out, and also causing the selector magnet SM to become de-energized.

The next horizontal dotted line shown across the sheet is indicative of the period at which the third pulse would arrive. However, for purposes of the present discussion, it is assumed that only two pulses are being transmitted. When additional pulses are used, at a predetermined time interval, after the next pulse would be normally expected, relay SRP releases and shortly thereafter, relay SD (which is energized when SRP releases) pulls up, thereby disconnecting the coil SM and preventing further pulses from being applied to the selector.

At this point, because of space limitations, the graph as shown is out of scale, since the period between the end of the waiting period and the end of the timing period would, in the present case, be rather long, as the timing period must be sufficiently long to allow receipt of the maximum number of pulses which might be put out plus a reasonable factor of safety. While the time from the top of the sheet down to the end of the period of waiting for the third pulse might be a matter of one or two seconds, the time between the end of the period of waiting for the third pulse and the end of the timing period might be in the nature of eight or ten seconds. At the end of the timing period the relay TP becomes energized by tube VI thereby opening the circuit to the relay IBR and causing this relay to become de-energized, thus extinguishing lamp IGK. Successively thereafter, relays IT, SA, and TD become de-energized. As soon as IT drops, IR also drops, and CD opens immediately thereafter. When relay SA drops the selector "off normal" relay SMR immediately starts to pulse, but this does not apply pulses to SM until such time as relay CDP drops, therefore there appears on the time chart a pulse for SMR but none for SM, when relay SA becomes deenergized. Relay BL becomes energized, and is immediately followed by IBLKR relay. The indicator light IBK is illuminated, and, after a proper time interval, relays CDP and ISR will drop. When relay CDP drops it causes the pulses of relay SMR to appear as pulses in the selector magnet SM, and these pulses occur repeatedly, until such time as the selector is returned to its "on normal" position. At this time the equipment has returned to rest, and only the proper indicator light IBK and holding relay IBLKR remain energized.

From the foregoing, it will be understood that the invention provides a novel and advantageous system for indicating and controlling from a control location, the position and movements of moving vehicles.

While the illustrated embodiment is primarily directed to instrumentalities for and a system of train control, it will be appreciated that such illustration is merely exemplary and that my invention is of wide utility and applicability.

I claim:

1. In a system for indicating, at a remote point the location of a moving object, a network adapted to establish communication between said object and said remote point, said network including transmitting apparatus carried by said object and so responsive to the progression of the object as to be conditioned to transmit a signal characteristic of the position of the object, means at said remote point effective to receive said signal and to utilize its positional characteristic to indicate the location of said object, control apparatus carried by said object and indicative of the position thereof, apparatus at said remote point effective to transmit a control signal, and means carried by said object and responsive to said control signal to provide a clearance or proceed indication at said object when the positional indication of said control apparatus coincides with the position of the object as transmitted to said remote point.

2. In a system for indicating at a remote point the location of a moving object, a network adapted to establish communication between said object and said remote point, said network including; means at said remote point for interrogating said object, interrogation-responsive transmitting apparatus associated with said object and further so responsive to the progression of the object as to be conditioned to transmit a signal characteristic of the position of the object, means at said remote point effective to receive said signal and to utilize its positional characteristic to indicate the location of said object, control apparatus carried by said object and indicative of the position thereof, apparatus at said remote point effective to transmit a control signal, and means carried by said object and responsive to said control signal to provide a clearance or proceed indication at said object when the positional indication of said control apparatus coincides with the position of the object as transmitted to said remote point.

3. A system in accordance with claim 2, further characterized by the inclusion of manually operable register means adapted to be adjusted to a setting corresponding to the position of the object, and means for disabling the said means for providing a proceed indication unless the position as transmitted from said object coincides with the positional adjustment of the register means.

4. In communication apparatus adapted to indicate, at a remote point, the position of any one of a plurality of vehicles moving within a predetermined territory, means carried by each vehicle and adapted to effect transmission of a signal characteristic of the position of that vehicle, a selective network controllable from said remote point and adapted to establish communication between said point and a particular one of said vehicles, means at said remote point for receiving the characteristic signal from said particular vehicle, an indicator for utilizing its positional characteristic to indicate the positon of the vehicle in the territory, control apparatus carried by said particular vehicle and indicative of the position thereof, apparatus at said remote point effective to transmit a control signal, and means carried by said vehicle and responsive to said control signal to provide a clearance or proceed indication at said vehicle when the positional indication of said control apparatus coincides with the position of the vehicle as transmitted to said remote point.

LIONEL M. RODGERS.

REFERENCES CITED

The following references are of record in the file of this patent:

UNITED STATES PATENTS

| Number | Name | Date |
| --- | --- | --- |
| 918,537 | Halvorsen | Apr. 20, 1909 |
| 1,702,423 | Wensley | Feb. 19, 1929 |
| 1,765,538 | Nelson | June 24, 1930 |
| 1,993,497 | Wells | Mar. 5, 1935 |
| 2,229,249 | Lewis | Jan. 21, 1941 |
| 2,252,083 | Luck | Aug. 12, 1941 |
| 2,363,416 | Henroteau | Nov. 21, 1944 |
| 2,396,812 | Baughman | Mar. 19, 1946 |
| 2,399,738 | Howe | May 7, 1946 |
| 2,421,106 | Wight | May 27, 1947 |
| 2,439,862 | Preston | Apr. 20, 1948 |

FOREIGN PATENTS

| Number | Country | Date |
| --- | --- | --- |
| 602,003 | Germany | Aug. 29, 1934 |